United States Patent
Hassan (10) Patent No.: US 11,860,899 B2
(45) Date of Patent: Jan. 2, 2024

(54) DATA SYNCHRONIZATION IN CLOUD PLATFORMS WITHOUT DATABASE LOCKING

(71) Applicant: SAP SE, Walldorf (DE)

(72) Inventor: Ahmad Hassan, Maidenhead (GB)

(73) Assignee: SAP SE, Walldorf (DE)

( * ) Notice: Subject to any disclaimer, the term of this patent is extended or adjusted under 35 U.S.C. 154(b) by 187 days.

(21) Appl. No.: 17/503,560

(22) Filed: Oct. 18, 2021

(65) Prior Publication Data
US 2023/0124068 A1    Apr. 20, 2023

(51) Int. Cl.
G06F 16/23    (2019.01)
G06F 16/25    (2019.01)
G06F 16/27    (2019.01)

(52) U.S. Cl.
CPC ........ *G06F 16/278* (2019.01); *G06F 16/2308* (2019.01); *G06F 16/2358* (2019.01); *G06F 16/2365* (2019.01); *G06F 16/256* (2019.01)

(58) Field of Classification Search
CPC ............. G06F 16/2308; G06F 16/2358; G06F 16/2365; G06F 16/256; G06F 16/278
See application file for complete search history.

(56) References Cited

U.S. PATENT DOCUMENTS

| | | | |
|---|---|---|---|
| 9,726,502 B2 | 8/2017 | Ni et al. | |
| 9,778,051 B2 | 10/2017 | Vo et al. | |
| 10,360,263 B2 | 7/2019 | Ni et al. | |
| 11,157,338 B2* | 10/2021 | Rodean | G06F 9/546 |
| 11,222,066 B1* | 1/2022 | Batsakis | G06F 16/27 |
| 2021/0034673 A1 | 2/2021 | Ni et al. | |
| 2022/0244949 A1* | 8/2022 | Iqbal | G06F 9/547 |
| 2023/0094159 A1* | 3/2023 | Difranco | G06F 9/5072 |
| | | | 718/1 |

OTHER PUBLICATIONS

Hoze, Nadav, "How We Maintain Tenant Data Isolation With Kafka at Scale", Medium.com blog post published Dec. 2, 2020, 20 pages. (Year: 2020).*
U.S. Appl. No. 17/488,422, filed Sep. 29, 2021, Ni.
U.S. Appl. No. 17/495,017, filed Oct. 6, 2021, Hassan.
Brewer, "Kubernetes the path to cloud native." Proceedings of the sixth ACM symposium on cloud computing, Aug. 2015, 27 pages.
Cox et al., "Serverless inferencing on Kubernetes." arXiv preprint arXiv:2007.07366, Jul. 2020, 5 pages.

(Continued)

*Primary Examiner* — Scott A. Waldron
(74) *Attorney, Agent, or Firm* — Fish & Richardson P.C.

(57) ABSTRACT

Methods, systems, and computer-readable storage media for receiving, by a messaging system, a message having a key, the key indicating a tenant of a set of tenants, providing, by the messaging system, the message in a partition of a messaging queue, reading, by a service instance, the message from the partition, the service instance being in a set of services instances, each service instance executing a service of a service-based application, and in response to the message, updating, by the service instance, at least a portion of data stored within a database system, the portion of data being associated with the tenant, the database system storing data of each tenant of the set of tenants.

20 Claims, 6 Drawing Sheets

(56) References Cited

OTHER PUBLICATIONS

Docs.Oracle.com [online], "2.6 The JCMD Utility" Sep. 2015 [retrieved on Sep. 29, 2021], retrieved from : URL <https://docs.oracle.com/javase/8/docs/technotes/guides/troubleshoot/tooldescr006.html>, 4 pages.

LeCun et al., "Deep learning." nature 521.7553, May 2015, 9 pages.

Prometheus.io [online], "Prometheus—Monitoring System and Time Series Database" Jan. 2015 [retrieved on Sep. 29, 2021], retrieved from : URL <https://prometheus.io/>, 5 pages.

Thurgood et al., "Cloud computing with Kubernetes cluster elastic scaling." Proceedings of the 3rd International Conference on Future Networks and Distributed Systems, Jul. 2019, 7 pages.

Wei-guo et al., "Research on Kubernetes' Resource Scheduling Scheme." Proceedings of the 8th International Conference on Communication and Network Security, Nov. 2018, 5 pages.

\* cited by examiner

DATA SYNCHRONIZATION IN CLOUD PLATFORMS WITHOUT DATABASE LOCKING

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. A common architecture in cloud platforms includes services (also referred to as microservices), which have gained popularity in service-oriented architectures (SOAs). In such SOAs, applications are composed of multiple, independent services that are deployed in standalone containers with well-defined interfaces. The services are deployed and managed within the cloud platform and run on top of a cloud infrastructure.

In multi-tenant deployments of service-based applications, services intermittently need to merge incoming data. For example, catalog updates and/or intelligence metrics are intermittently merged into data records within database systems. When running multiple instances of a service, each service instance can have a scheduled thread that wakes up, determines all tenants that need updating of data (e.g., product catalog update), performs the calculations for merging the data, and merges the data. If multiple services are attempting to merge data at the same, it is likely that there will be a conflict between the multiple services, which could result in corruption of data within the underlying database. To alleviate this, traditional approaches implement database locking, in which merging executed for a service locks at least a portion of the database from access by other services. This is problematic in that the other services are unable to execute certain functionality, while database locking is engaged.

SUMMARY

Implementations of the present disclosure are directed to a synchronization framework for executing data updates in multi-tenant, service-based applications. More particularly, and as described in further detail herein, the synchronization framework of the present disclosure leverages a messaging queue and uses messaging queue partitioning and consumer groups to apply consistent and concurrent updates of data in multi-tenant, service-based applications. As described in further detail herein, implementations of the present disclosure enable data updates in database systems without database locking.

In some implementations, actions include receiving, by a messaging system, a first message having a first key, the first key indicating a first tenant of a set of tenants, providing, by the messaging system, the first message in a first partition of a messaging queue, reading, by a first service instance, the first message from the first partition, the first service instance being in a set of services instances, each service instance executing a service of a service-based application, and in response to the first message, updating, by the first service instance, at least a portion of first data stored within a database system, the portion of first data being associated with the first tenant, the database system storing data of each tenant of the set of tenants. Other implementations of this aspect include corresponding systems, apparatus, and computer programs, configured to perform the actions of the methods, encoded on computer storage devices.

These and other implementations can each optionally include one or more of the following features: the first service instance is assigned to a first consumer group that exclusively reads messages from the first partition, and other service instances assigned to the first consumer group are prevented from reading the first message after the first message is read by the first service instance; each partition of the messaging queue is specific to a tenant in the set of tenants; actions further include receiving, by the messaging system, a second message having a second key, the second key indicating a second tenant of the set of tenants, providing, by the messaging system, the second message in a second partition of the messaging queue, reading, by a second service instance, the second message from the second partition, the second service instance being in the set of services instances, and in response to the second message, updating, by the second service instance, at least a portion of second data stored within the database system, the portion of second data being associated with the second tenant; actions further include receiving, by the messaging system, a second message having the first key, providing, by the messaging system, the second message in the first partition of the messaging queue, reading, by the first service instance, the second message from the first partition, and in response to the second message, updating, by the second service instance, at least a portion of second data stored within the database system, the portion of second data being associated with the first tenant; each service instance in the set of service instances is executed in a container of a container orchestration system; and a database lock is absent during updating of the at least a portion of first data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a synchronization framework for executing data updates in multi-tenant, service-based applications. More particularly, and as described in further detail herein, the synchronization framework of the present disclosure leverages a messaging queue and uses messaging queue partitioning and consumer groups to apply consistent and concurrent updates of data in multi-tenant, service-based applications. As described in further detail herein, implementations of the present disclosure enable data updates in database systems without database locking.

In some implementations, actions include receiving, by a messaging system, a first message having a first key, the first key indicating a first tenant of a set of tenants, providing, by the messaging system, the first message in a first partition of a messaging queue, reading, by a first service instance, the first message from the first partition, the first service instance being in a set of services instances, each service instance executing a service of a service-based application, and in response to the first message, updating, by the first service instance, at least a portion of first data stored within a database system, the portion of first data being associated with the first tenant, the database system storing data of each tenant of the set of tenants.

To provide further context for implementations of the present disclosure, and as introduced above, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. A common architecture in cloud platforms includes services (also referred to as microservices), which have gained popularity in service-oriented architectures (SOAs). In such SOAs, applications are composed of multiple, independent services that are deployed in stand-alone containers with well-defined interfaces. The services are deployed and managed within the cloud platform and run on top of a cloud infrastructure.

For example, a software vendor can provide an application that is composed of a set of services that are executed within a cloud platform. By way of non-limiting example, an electronic commerce (e-commerce) application can be composed of a set of 20-30 services, each service performing a respective function (e.g., order handling, email delivery, remarking campaigns, handling and payment). Each service is itself an application (e.g., a Java application) and one or more instances of a service can execute within the cloud platform. In some examples, such as in the context of e-commerce, multiple tenants (e.g., users, enterprises) use the same application. For example, and in the context of e-commerce, while a brand (e.g., an enterprise) has their individual web-based storefront, all brands share the same underlying services. Consequently, each service is multi-tenant aware (i.e., manages multiple tenants) and provides resource sharing (e.g., network throughput, database sharing, hypertext transfer protocol (HTTP) restful request handling on application programming interfaces (APIs)).

In multi-tenant deployments of service-based applications, services intermittently need to merge incoming data. For example, catalog updates and/or intelligence metrics are intermittently merged into data records within database systems. When running multiple instances of a service, each service instance can have a scheduled thread that wakes up, determines all tenants that need updating of data (e.g., product catalog update), performs the calculations for merging the data, and merges the data. If multiple services are attempting to merge data at the same, it is likely that there will be a conflict between the multiple services, which could result in corruption of data within the underlying database. To alleviate this, traditional approaches implement database locking, in which merging executed for a service locks at least a portion of the database from access by other services. This is problematic in that the other services are unable to execute certain functionality, while database locking is engaged.

In view of the above context, implementations of the present disclosure provide a synchronization framework that leverages a messaging queue and uses messaging queue partitioning and consumer groups to apply consistent and concurrent updates of data in multi-tenant, service-based applications. As described in further detail herein, implementations of the present disclosure enable data updates in database systems without database locking.

Implementations of the present disclosure are described in further detail herein with reference to an example context. The example context includes an e-commerce context, in which multiple enterprises (e.g., a brands) use an application provided by a software vendor, each of the enterprises being referred to as a tenant with respect to the application. The application is composed of a set of services that are executed within a container orchestration system (e.g., Kubernetes) of a cloud platform. In the example e-commerce context, the enterprises can include respective web-based front-ends, through which users (e.g., customers) can interact with the application. In some examples, each web-based front-end is provided as a progressive web application, which can be described as a type of application software (e.g., programmed using hypertext mark-up language (HTML), cascading style sheets (CSS), and/or JavaScript) delivered through the Internet, and intended to work on platforms that use standards-compliant browsers (e.g., desktop, mobile). In the e-commerce context, a user can browse a catalog of products and/or services and can make purchases through the web-based front-end. Further, back-ends (e.g., back offices, workbenches) are provided, which enable enterprise to configure respective strategies of the front-end (storefront) will be designed and what content to show where.

That is, the back-end is where all of the strategies, product promotions, and the like, are configured by a respective enterprise.

In the e-commerce context, a user can browse a catalog of products and/or services and can make purchases through the web-based front-end. User interactions with the application result in requests being transmitted to one or more services for handling. For example, user interactions can result in functionality that is performed by one or more services (e.g., order handling, email delivery, remarking campaigns, handling and payment). Enterprises, however, periodically update product catalogs, which can be centrally stored in a database system. For example, product catalogs can be intermittently updated to reflect products that are out-of-stock, products that are discontinued, and/or newly offered products. Further, enterprises collect intelligence metrics that can be representative of performance of their e-commerce site, product performance (e.g., impressions, conversions), and the like. The intelligence metrics are intermittently updated within a database system, for example, to enable analytics and other functionality to be performed on the data.

While implementations of the present disclosure are described herein with reference to the e-commerce context, it is contemplated that implementations of the present disclosure can be realized in any appropriate context.

Figure 1:
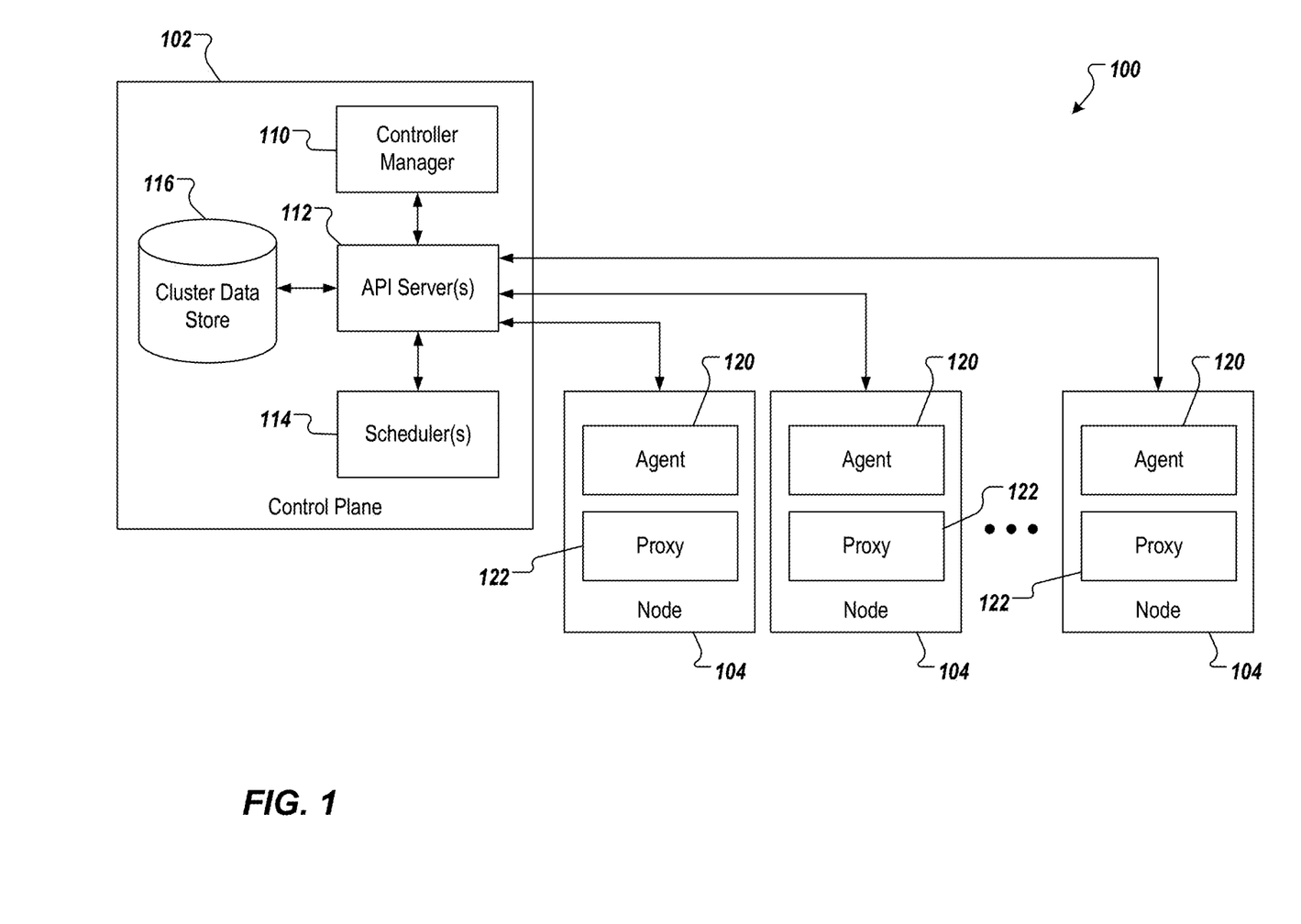
FIG. 1 depicts an example container orchestration architecture.

FIG. 1 depicts an example container orchestration architecture 100 in accordance with implementations of the present disclosure. In the depicted example, the example container orchestration architecture 100 represents deployment of a portion of the container orchestration system Kubernetes introduced above. More particularly, the example architecture 100 represents a basic structure of a cluster within Kubernetes.

In the example of FIG. 1, the example architecture 100 includes a control plane 102 and a plurality of nodes 104. Each node 104 can represent physical worker machines and are configured to host pods. In Kubernetes, a pod is the smallest deployable unit of resources and each pod is provided as one or more containers with shared storage/network resources, and a specification for how to run the containers. In some examples, a pod can be referred to as a resource unit that includes an application container. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In some examples, the controllers in the controller manager 110 should be logically independent of each other and be executed separately. In some examples, the controller processes are all compiled into one single binary that is executed in a single process to reduce system complexity. It is noted the control plane 102 can be run/executed on any machine in the cluster. In some examples, the control plane 102 is run on a single physical worker machine that does not host any pods in the cluster.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

Figure 2:
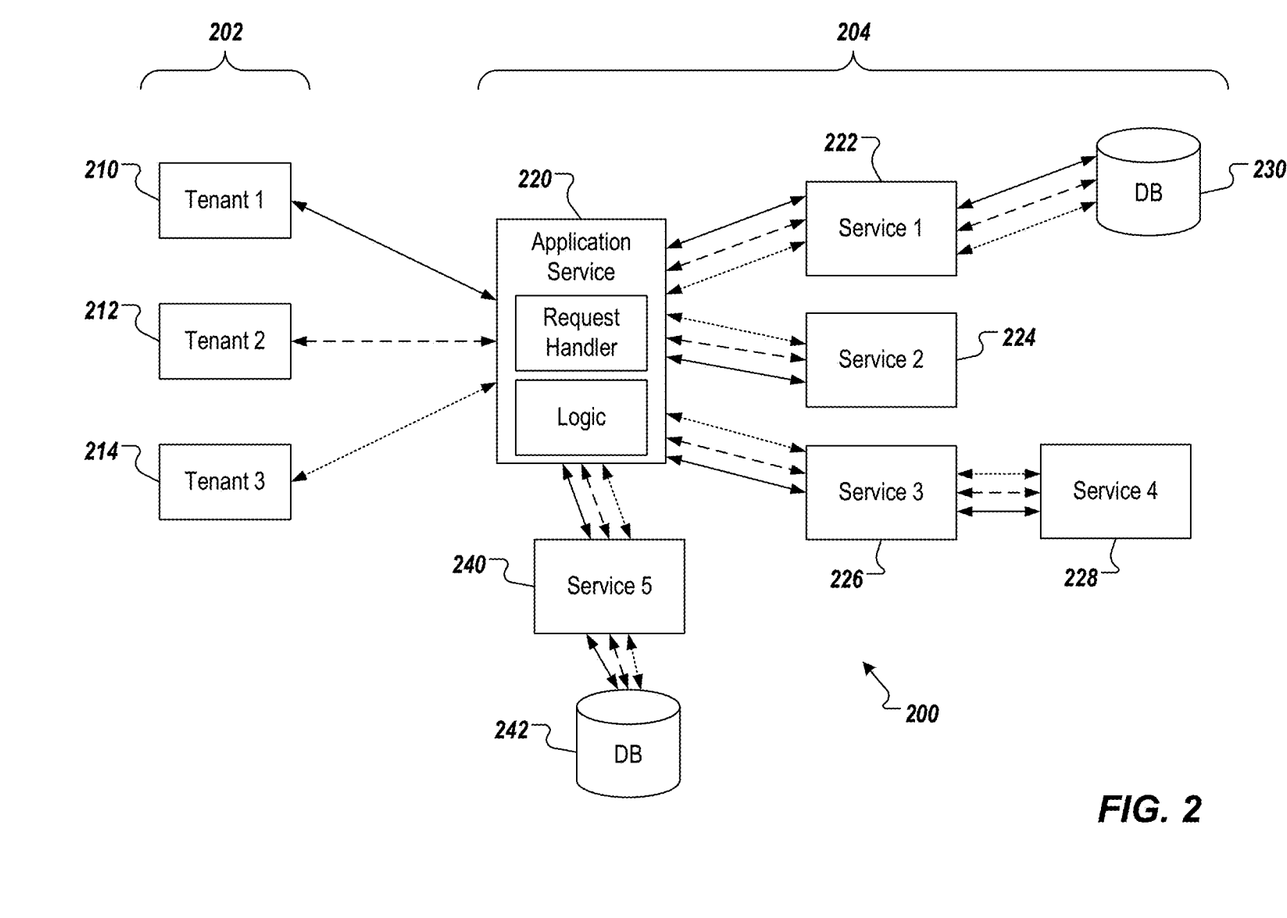
FIG. 2 depicts a conceptual representation of an application hosted in a cloud platform.

FIG. 2 depicts a conceptual representation of an application 200 hosted in a cloud platform. As described herein, the application 200 is a multi-tenant, service-based application. In the example of FIG. 2, a front-end 202 and a back-end 204 are depicted, the back-end 204 representing a cloud platform. The front-end 202 includes front-end components 210, 212, 214 associated with respective tenants (e.g., enterprises). For example, each front-end components 210, 212, 214 can be provided as a web-based front-ends, through which users (e.g., customers) can interact with the application 200. For example, in the e-commerce context, the front-end components 210, 212, 214 can be provided as browser-based store front-ends of respective enterprises that enable customers of the respective enterprises to peruse products and make purchases.

In the example of FIG. 2, the application 200 is a service-based application and includes an application service 220 and services 222, 224, 226, 228. In the depicted example, the service 222 interacts with a database system 230. In some examples, the application service 202 functions as a gateway between the front-end components 210, 212, 214 and the services 222, 224, 226, 228. For example, the front-end components 210, 212, 214 and the application service 220 can be provided by a software vendor, while one or more of the services 222, 224, 226, 228 and/or the database system 230 can be provided by another software vendor.

In some examples, the application service 220 handles requests received from one or more of the front-end components 210, 212, 214. For example, the application service 220 can itself include logic that can process a request from one of the front-end components 210, 212, 214 and provide a response the front-end component 210, 212, 214. As another example, the application service 220 can include a request handler to forward requests to one or more of the services 222, 224, 226, 228. For example, each service 222, 224, 226, 228 executes particularized functionality to provide a response to a request, or at least a portion of a request. In this sense, and for the functionality executed by and data received from the services 222, 224, 226, 228, the application service 220 functions as a proxy. In some examples, the application service 220 receives a request, breaks down the request into one or more sub-requests (e.g., specialized requests) and forwards the one or more sub-requests to respective services 222, 224, 226, 228. The application service 220 receives responses from the respective services 222, 224, 226, 228, and packages the responses into a single response back to the front-end component 210, 212, 214 that issued the original request. In this sense, the application service 220 can be described as an aggregator of data returned by the services 222, 224, 226, 228. In some examples, the application service 220 and the services 222, 224, 226, 228 take incoming requests through multiple channels. An example channel includes representational state transfer (REST) controllers for HTTP requests (e.g., GET, PUT, POST, DELETE). Another example channel is through messaging systems (e.g., messaging queue listeners, consumers, such as Kafka and Rabbit).

With reference to the non-limiting context of e-commerce, a request from the front-end component 210 can be received by the application service 220. For example, the request can be issued by a user to request display of products that are available through the e-commerce site of an enterprise, here, a first tenant (Tenant 1). In response to the request, the application service 220 can determine that a page is to be displayed in the front-end component 210 and can determine that product information and product suggestions are to be displayed in the page. The application service 220 can issue a sub-request to the service 222, which is, in this example, a product catalog service. The service 222 retrieves product catalog data from the database system 230 and provides a response to the application service 220, which response includes the product catalog data. The application can issue a sub-request to the service 224, which is, in this example, a product suggestions service (e.g., executing a recommendation engine). The service 224 provides product recommendation data in a response to the application service 220. The application service 220 aggregates the product catalog data and the product recommendation data and provides a response to the front-end component 210 to display a page depicting the product catalog data and the product recommendation data (e.g., as images and/or text).

Continuing with this example, the user can decide to purchase a product by selecting the product and providing payment information represented in a request to the application service 220. The application service 220 can send a sub-request to the service 226, which, in this example, is a payment handling service. In this example, the service 226 can send a sub-request to the service 228, which, in this example, is a payment verification service (e.g., a credit card service that provides purchase approvals/denials). The service 228 provides a response to the service 226, which provides a response to the application service 220. The application service 220 provides a response to the front-end component 210 (e.g., instructions to display purchase approval/denial to the user).

In the example of FIG. 2, the application 200 further includes a service 240 that interacts with a database system 242. In some examples, the service 240 can be an analytics service that executes analytics over intelligence metrics (data) of respective enterprises. In some examples, the intelligence metrics are stored in the database system 242 and is intermittently updated. As noted above, product catalog data is provided in the database system 230. The product catalog data is intermittently updated in the database system 230.

As a cloud-based application, the components of the back-end 204 are executed within containers of a container orchestration system, such as Kubernetes. As introduced above, a container is defined as a standalone unit of software that is packaged with application (service) code along with all dependencies of the application (service) to run as a single application (service). In the example of FIG. 2, because the application 200 supports multiple tenants (e.g., multiple enterprises having respective e-commerce sites powered by the application 200), each of the components is tenant-aware. That is, for example, the application service 220 discerns a tenant of a set of tenants based on data provided in the request (e.g., data indicating which tenant is the source of the request) to, in response to the request, provide instructions to display a page that is particular to the tenant (e.g., includes the logo, branding, and the like of the particular tenant). As another example, the service 222 discerns a tenant of the set of tenants based on data provided in the sub-request (e.g., data indicating which tenant is the sub-request is sent on behalf of) to, in response to the sub-request, provide product catalog data that is particular to the tenant (e.g., includes the products offered for sale by the particular tenant).

As evidenced in the discussion of FIG. 2, in order to support front-end components (e.g., the front-end components 210, 212, 214), services (e.g., the services 220, 222, 224, 226, 228, 240) execute on the cloud platform to provide the core functionality of the platform (e.g., e-commerce platform including the application 200). As introduced above, one of the key challenges in so-configured platforms (e.g., multi-tenant, service-based applications) is to intermittently synchronize tenant-specific data stored in one or more back-end database systems with new data. This synchronization is done repeatedly for all of the tenants. In some examples, synchronization of data is executed at regular time intervals t.

Figure 3A:
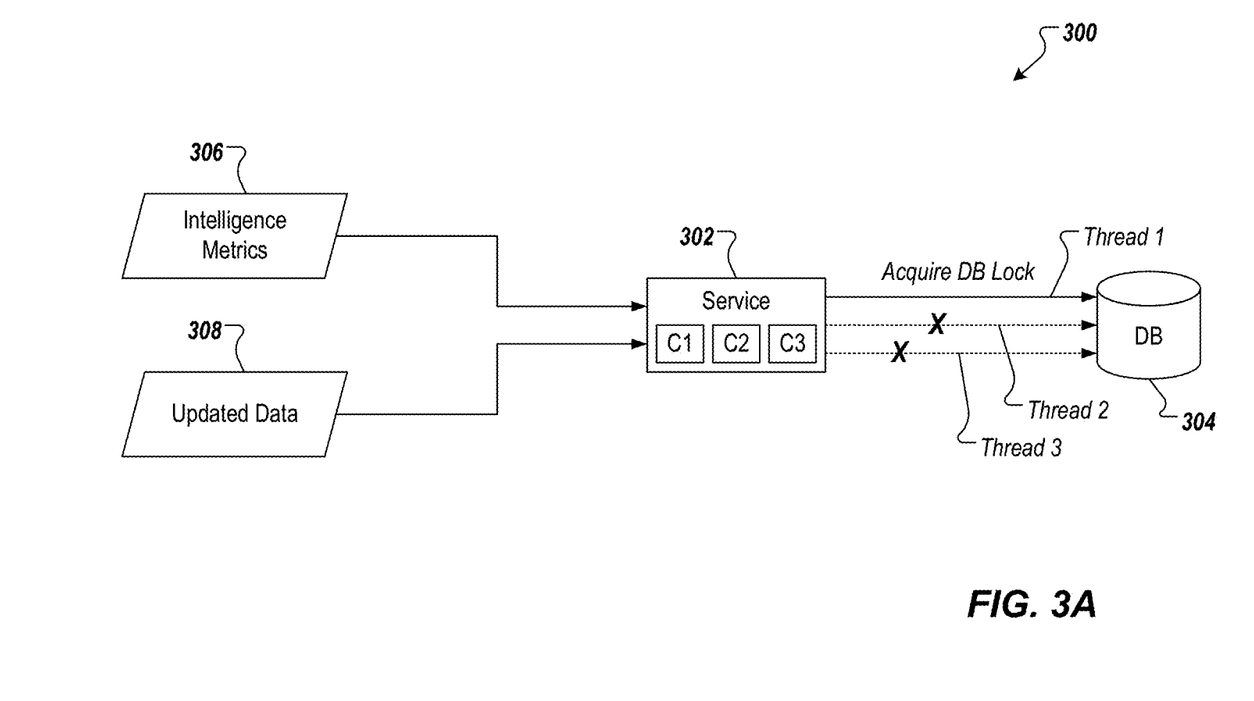
FIG. 3A depicts an example architecture that uses database locking for data updates.

FIG. 3A depicts an example architecture 300 that uses database locking for data updates. In the example of FIG. 3A, the example architecture 300 includes a service 302 that intermittently updates data withing a database system 304. In the example of FIG. 3A, intelligence metrics 306 and updated data 308 (e.g., updated product catalog data) are depicted. In a cloud platform, multiple instances of the service 302 are executed in respective resource units. In the case of Kubernetes, a pod is a resource unit and includes a container, within which an instance of the service 302 is executed. In the example of FIG. 3A, three containers C1, C2, C3 (i.e., three pods) are depicted. In some examples, each container corresponds to a respective tenant. That is, a service instance is provided for each tenant.

As depicted in FIG. 3A, a thread of the service 302 wakes up after time t and acquires a database lock in the database system 304. For example, a thread (Thread 1) can correspond to the container C1. At time t, the thread reads an update table within the database system 304 to determine whether data is to be updated for any tenant (e.g., do any of the enterprises have an update to a respective product catalog). In some examples, the update table includes a tenant column and an update column and each row indicates a respective tenant and an indicator as to whether data for the tenant is to be updated. In the example of FIG. 3A, the first thread can read the update table and determine that data is to be updated. In response, the first thread acquires a database lock on the update table within the database system 304. In some examples, a row-level database lock is acquired on the update table (i.e., the table with the list of tenants eligible for an update operation). In the example of FIG. 3A, if a first tenant corresponding to the first thread is next in line to apply an update, the row containing the first tenant record is locked, such that no other thread can touch or update the first tenant.

In some examples, the database lock can include a SQL lock on a relational table corresponding to a tenant. During synchronization, the SQL lock blocks access to the relational table from other threads that attempt to update for the tenant. In some examples, the synchronization service acquires a PESSIMISTIC_WRITE lock, which also blocks read-only access (e.g., prevents other transactions from reading, updating, deleting). The database lock is released after the thread completes synchronization, such that other threads can continue processing the tenant. For example, and as depicted in FIG. 3A, a thread of the container C2 (Thread 2) and a thread of the container C3 (Thread 3) are blocked from access, until the lock is released. This approach, however, is very cumbersome and problematic, because, for example, it requires application-triggered locks on the database, which essentially blocks concurrent requests (even read-only requests) to the tenant, while synchronization is ongoing.

In view of this, implementations of the present disclosure provide a synchronization framework that leverages a messaging queue and uses messaging queue partitioning and consumer groups to apply consistent and concurrent updates of data in multi-tenant, service-based applications. In this manner, database locking is obviated. As described in further detail herein, the messaging system is used to simulate database locking in a concurrent manner. Implementations of the present disclosure ensure that, when constructing interim data for batch updates, exactly one interim data copy is created and a received counter stays correct. Implementations of the present disclosure ensure that only one instance of a thread is processing one tenant to avoid data duplication.

In some examples, a messaging system is provided as Apache Kafka, also referred to herein as Kafka, which can be described as an open-source distributed event streaming messaging platform. It is contemplated, however, that any appropriate messaging system can be used. Kafka is a publish-subscribe messaging system that uses uniquely named topics to deliver feeds of messages from producers to consumers. For example, consumers can subscribe to a topic to receive a notification when a message of the topic is added to a messaging queue. Producers produce messages, which include key-value pairs, and can assign topics to messages.

Kafka provides multiple partitions within the messaging queue for a topic to scale and achieve fault tolerance. Partitions enable data of a topic to be split across multiple broker servers for writes by multiple producers and reads by multiple consumers. Messages (and data within the messages) are stored in the partitions for subsequent consumption by consumers. Each message is assigned a key and each partition corresponds to a key. In this manner, messages having the same key are assigned to the same partition. On the consumer side, multiple consumers will read from the same topic and, as such, each message could be read more than once. However, only one consumer is allowed to read data from a partition. To handle this, Kafka provides for grouping of consumers into consumer groups. For example, consumers can be grouped into a consumer group based on common functionality within a system. While Kafka provides only one consumer to read per partition, multiple consumer groups can read from a partition. Here, each consumer is assigned to a consumer group and subscribes to a topic using a consumer group identifier.

In accordance with implementations of the present disclosure, each container is a consumer and the containers are assigned to a consumer group. Messages associated with tenants are published with a key indicating the tenant. In this manner, all messages associated with a particular tenant go to the same partition. In other words, partitions are specific to tenants. For example, for a first tenant, a key <Tenant1> can be used and, for a second tenant, a key <Tenant2> can be used. Messages with the same key go to the same partition. This is represented in Table 1, below:

TABLE 1

Message Distribution to Partitions

| Message (Event) | Key | Partition |
| --- | --- | --- |
| 1 | Tenant1 | P1 |
| 2 | Tenant2 | P2 |
| 3 | Tenant1 | P1 |
| 4 | Tenant3 | P3 |

With multiple service instances (containers) that consume messages, the number of partitions can be set to the number of service instances. By assigning each service instance to a single, respective consumer group, the messaging system ensures that only a single service instance (container) will ever consume any given message. This is represented in Table 2, below:

TABLE 2

Consumer to Partitions Mapping

| Message (Event) | Partition | Consumer |
| --- | --- | --- |
| 1 | P1 | C1 |
| 2 | P2 | C2 |
| 3 | P1 | C1 |
| 4 | P3 | C3 |

Figure 3B:
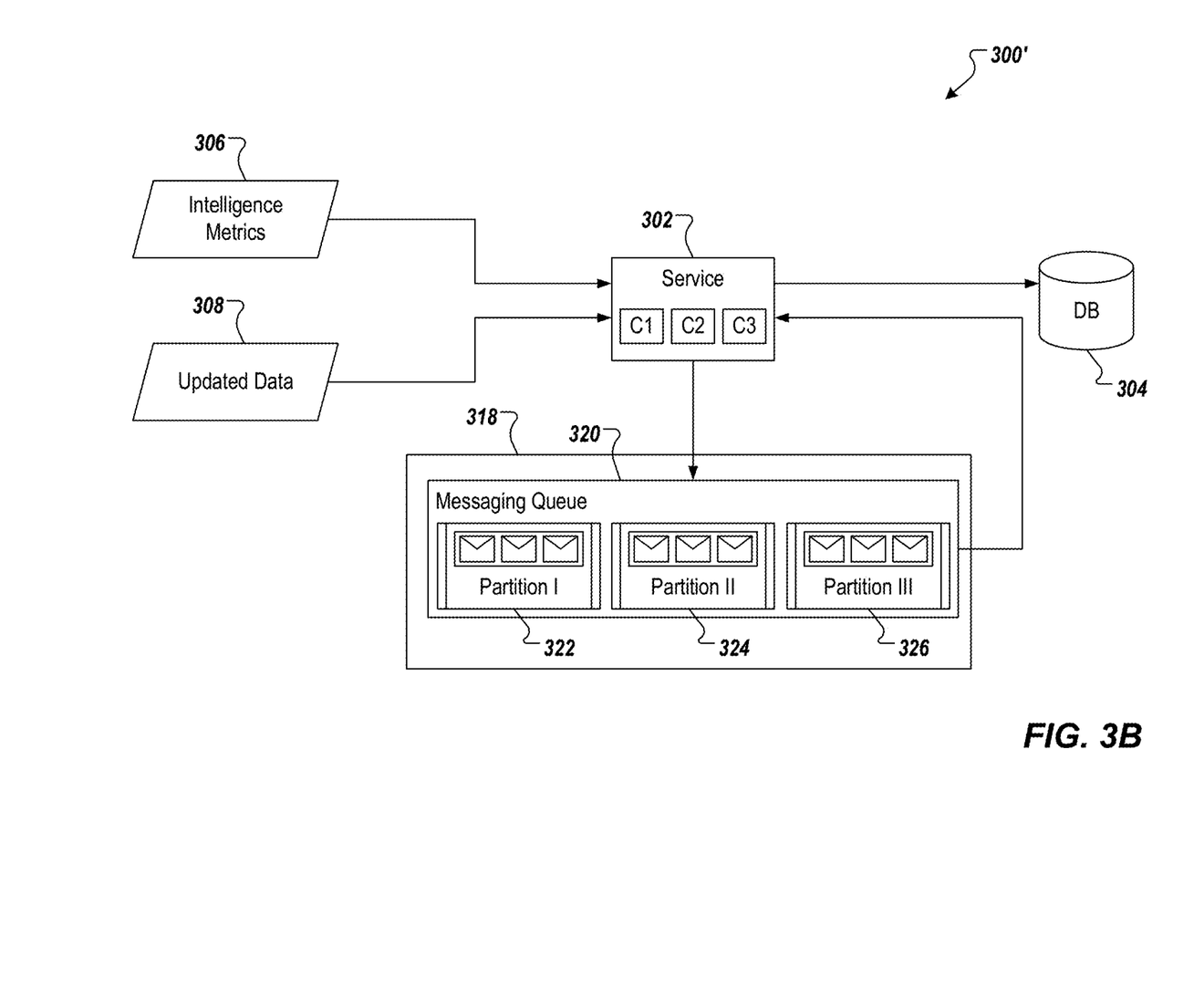
FIG. 3B depicts an example architecture that provides data updates in accordance with implementations of the present disclosure.

FIG. 3B depicts an example architecture 300' that provides data updates in accordance with implementations of the present disclosure. In the example of FIG. 3B, the example architecture 300' includes the synchronization service 302, the database system 304, and a messaging system 318 (e.g., Apache Kafka). The messaging system 318 includes a messaging queue 320 that includes partitions 322, 324, 326. Although three partitions are depicted, it is contemplated that any appropriate number of partitions can be used. Further, a set of consumer groups is defined within the messaging system 318. In partitioning of the message queue 320, the partitioning dictates how messages (events) are placed and consumed from the message queue 320. When an event comes into the messaging system 318, the message is placed in one of the partitions 322, 324, 326.

For example, the partition 322 can correspond to C1, the partition 324 can correspond to C2, and the partition 326 can correspond to the container 326. To update data, a batch update is assigned a unique identifier <UUID> and a type <TYPE>. For example, the batch update can include a set of product catalog data that is to be updated in the database system 304. Here, <TYPE> indicates an event type. For example, messages for intelligence metrics will have the type 'metrics-update' and the messages from catalog update have the type 'catalog-update'. In some examples, a message also includes a payload of data that is to be updated. A message including the <UUID> and the <TYPE> is put into a topic, and the message is keyed by tenant <TENANT>. Here, <TENANT> indicates the particular tenant, for which the data is being updated (e.g., product catalog data for the product catalog of Tenant1). This keying procedure ensures that records will be processed by the consumers in order.

In the context of a cloud application, and as noted above, the application is made up of several services. If a first service sends a message to one or more second services, the first is a producer and the second service(s) is/are consumer(s). In some examples, a catalog service is provided, which manages the catalog updates. The catalog service publishes a message with <UUID> and <TYPE> to mark all of the catalog messages with the same <TYPE> (e.g., 'catalog-update').

A consumer reads the message from the respective partition and start processing the update based on the information provided in the message. As by design, only one consumer can read any given message, once a message is read, no other consumer can read the message and also attempt to process the update. For example, and with reference to FIG. 3B, a message keyed to <Tenant1> is published and is added to the partition 322. The container C1 reads the message from the partition 322 and begins processing the update for Tenant1. Once the message is consumed, the message cannot be consumed again.

Figure 4:
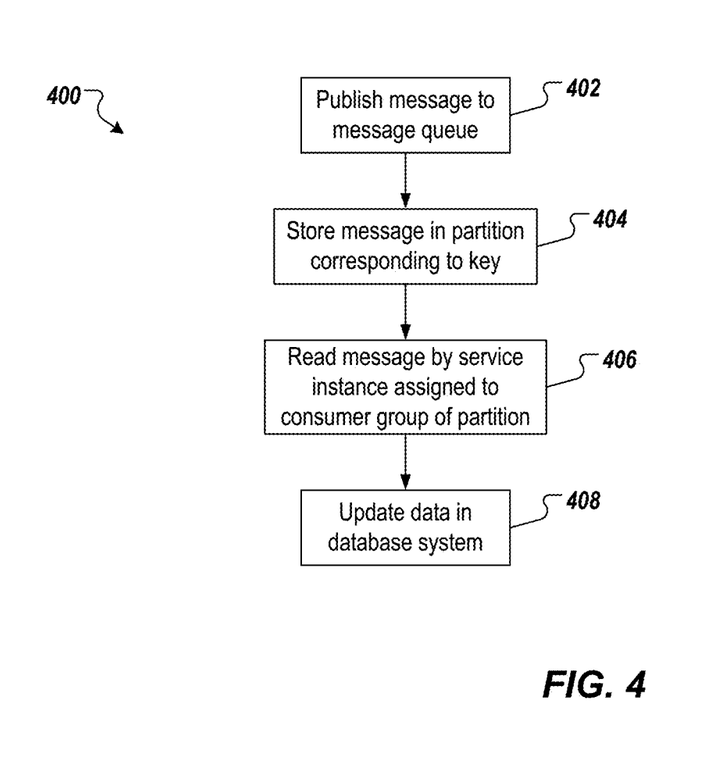
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable program executed by one or more computing devices.

A message is published to a message queue (402). For example, and as described herein, a catalog service can publish a message with <UUID> and <TYPE> to mark all of the catalog messages with the same <TYPE> (e.g., 'catalog-update'). The message is keyed by tenant <TENANT>. Here, <TENANT> indicates the particular tenant, for which the data is being updated (e.g., product catalog data for the product catalog of Tenant1). As discussed herein, this keying procedure ensures that records will be processed by the consumers in order. The message is stored in a partition corresponding to the key (404) and the message is read by a service instance that is assigned to a consumer group of the partition (406). For example, and as described herein, a message keyed to <Tenant1> is published and is added to the partition 322. The container C1 reads the message from the partition 322 and begins processing the update for Tenant1. Once the message is consumed, the message cannot be consumed again. Data is updated within the database system (408). For example, and as described herein, the container C1 updates data (e.g., product catalog data) within the database system 304 using a payload provided in the message.

Figure 5:
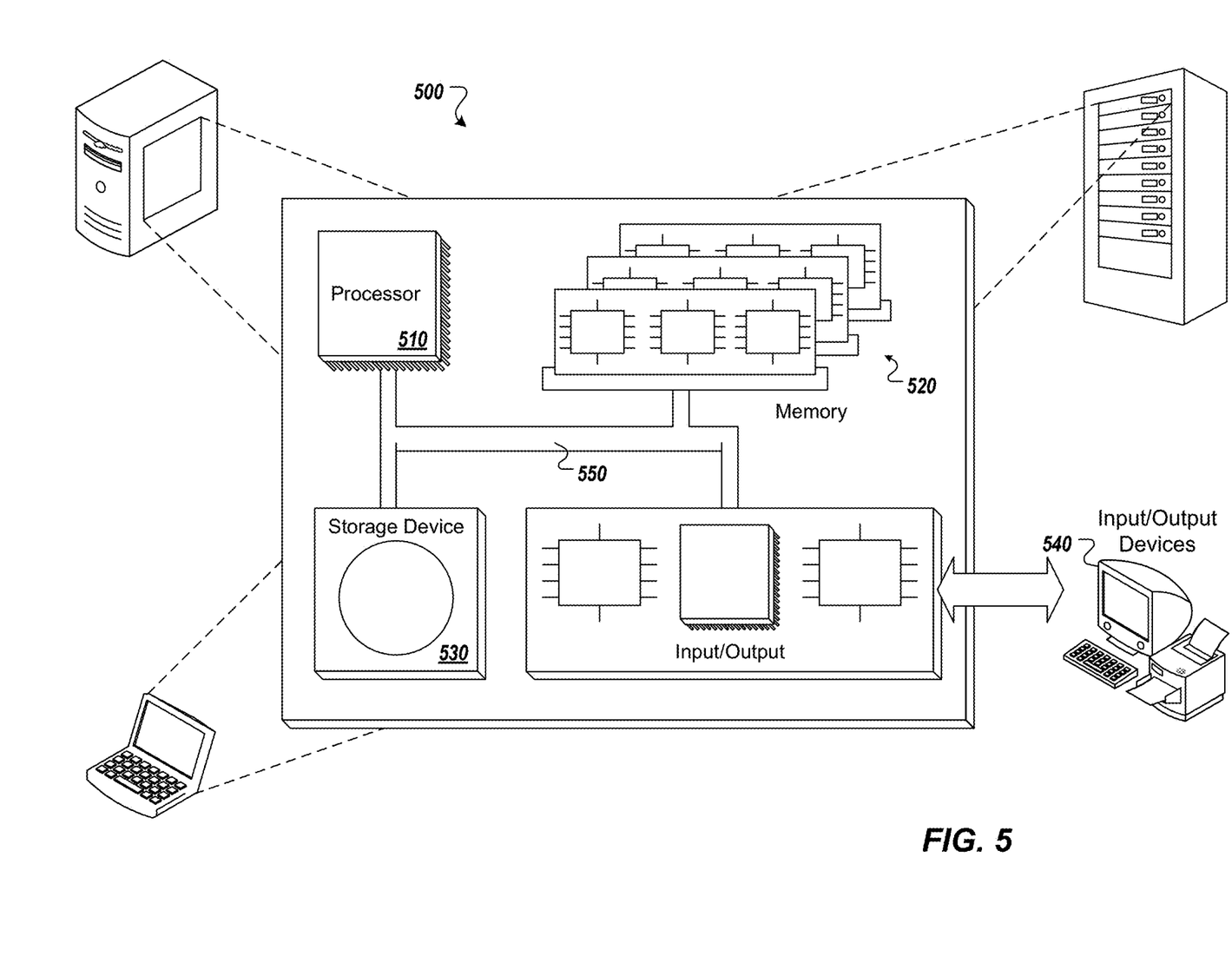
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for updating data in databases accessed by multi-tenant, service-based applications, the method being executed by one or more processors and comprising:
   receiving, by a messaging system, a first message having a first key, the first key indicating a first tenant of a set of tenants;
   providing, by the messaging system, the first message in a first partition of a set of partitions of a messaging queue in response to the first key indicating the first tenant, a number of partitions in the set of partitions being based on a number of service instances in a set of service instances;
   reading, by a first service instance, the first message from the first partition, the first service instance being in the set of services instances, each service instance executing a service of a service-based application; and
   in response to the first message, updating, by the first service instance, at least a portion of first data stored within a database system, the at least a portion of first data being associated with the first tenant, the database system storing data of each tenant of the set of tenants.

2. The method of claim 1, wherein the first service instance is assigned to a first consumer group that exclusively reads messages from the first partition, and other service instances assigned to the first consumer group are prevented from reading the first message after the first message is read by the first service instance.

3. The method of claim 1, wherein each partition of the messaging queue is specific to a tenant in the set of tenants.

4. The method of claim 1, further comprising:
   receiving, by the messaging system, a second message having a second key, the second key indicating a second tenant of the set of tenants;
   providing, by the messaging system, the second message in a second partition of the messaging queue;
   reading, by a second service instance, the second message from the second partition, the second service instance being in the set of services instances; and
   in response to the second message, updating, by the second service instance, at least a portion of second data stored within the database system, the portion of second data being associated with the second tenant.

5. The method of claim 1, further comprising:
   receiving, by the messaging system, a second message having the first key;
   providing, by the messaging system, the second message in the first partition of the messaging queue;
   reading, by the first service instance, the second message from the first partition; and
   in response to the second message, updating, by the first service instance, at least a portion of second data stored within the database system, the portion of second data being associated with the first tenant.

6. The method of claim 1, wherein each service instance in the set of service instances is executed in a container of a container orchestration system.

7. The method of claim 1, wherein a database lock is absent during updating of the at least a portion of first data.

8. A non-transitory computer-readable storage medium coupled to one or more processors and having instructions stored thereon which, when executed by the one or more processors, cause the one or more processors to perform operations for updating data in databases accessed by multi-tenant, service-based applications, the operations comprising:
   receiving, by a messaging system, a first message having a first key, the first key indicating a first tenant of a set of tenants;
   providing, by the messaging system, the first message in a first partition of a set of partitions of a messaging queue in response to the first key indicating the first tenant, a number of partitions in the set of partitions being based on a number of service instances in a set of service instances;
   reading, by a first service instance, the first message from the first partition, the first service instance being in the set of services instances, each service instance executing a service of a service-based application; and
   in response to the first message, updating, by the first service instance, at least a portion of first data stored within a database system, the portion of first data being associated with the first tenant, the database system storing data of each tenant of the set of tenants.

9. The non-transitory computer-readable storage medium of claim 8, wherein the first service instance is assigned to a first consumer group that exclusively reads messages from the first partition, and other service instances assigned to the first consumer group are prevented from reading the first message after the first message is read by the first service instance.

10. The non-transitory computer-readable storage medium of claim 8, wherein each partition of the messaging queue is specific to a tenant in the set of tenants.

11. The non-transitory computer-readable storage medium of claim 8, wherein operations further comprise:
receiving, by the messaging system, a second message having a second key, the second key indicating a second tenant of the set of tenants;
providing, by the messaging system, the second message in a second partition of the messaging queue;
reading, by a second service instance, the second message from the second partition, the second service instance being in the set of services instances; and
in response to the second message, updating, by the second service instance, at least a portion of second data stored within the database system, the portion of second data being associated with the second tenant.

12. The non-transitory computer-readable storage medium of claim 8, wherein operations further comprise:
receiving, by the messaging system, a second message having the first key;
providing, by the messaging system, the second message in the first partition of the messaging queue;
reading, by the first service instance, the second message from the first partition; and
in response to the second message, updating, by the first service instance, at least a portion of second data stored within the database system, the portion of second data being associated with the first tenant.

13. The non-transitory computer-readable storage medium of claim 8, wherein each service instance in the set of service instances is executed in a container of a container orchestration system.

14. The non-transitory computer-readable storage medium of claim 8, wherein a database lock is absent during updating of the at least a portion of first data.

15. A system, comprising:
a computing device; and
a computer-readable storage device coupled to the computing device and having instructions stored thereon which, when executed by the computing device, cause the computing device to perform operations for updating data in databases accessed by multi-tenant, service-based applications, service-based applications, the operations comprising:
receiving, by a messaging system, a first message having a first key, the first key indicating a first tenant of a set of tenants;
providing, by the messaging system, the first message in a first partition of a set of partitions of a messaging queue in response to the first key indicating the first tenant, a number of partitions in the set of partitions being based on a number of service instances in a set of service instances;
reading, by a first service instance, the first message from the first partition, the first service instance being in the set of services instances, each service instance executing a service of a service-based application; and
in response to the first message, updating, by the first service instance, at least a portion of first data stored within a database system, the portion of first data being associated with the first tenant, the database system storing data of each tenant of the set of tenants.

16. The system of claim 15, wherein the first service instance is assigned to a first consumer group that exclusively reads messages from the first partition, and other service instances assigned to the first consumer group are prevented from reading the first message after the first message is read by the first service instance.

17. The system of claim 15, wherein each partition of the messaging queue is specific to a tenant in the set of tenants.

18. The system of claim 15, wherein operations further comprise:
receiving, by the messaging system, a second message having a second key, the second key indicating a second tenant of the set of tenants;
providing, by the messaging system, the second message in a second partition of the messaging queue;
reading, by a second service instance, the second message from the second partition, the second service instance being in the set of services instances; and
in response to the second message, updating, by the second service instance, at least a portion of second data stored within the database system, the portion of second data being associated with the second tenant.

19. The system of claim 15, wherein operations further comprise:
receiving, by the messaging system, a second message having the first key;
providing, by the messaging system, the second message in the first partition of the messaging queue;
reading, by the first service instance, the second message from the first partition; and
in response to the second message, updating, by the first service instance, at least a portion of second data stored within the database system, the portion of second data being associated with the first tenant.

20. The system of claim 15, wherein each service instance in the set of service instances is executed in a container of a container orchestration system.

* * * * *